(12) United States Patent
Petrov

(10) Patent No.: US 9,640,120 B2
(45) Date of Patent: *May 2, 2017

(54) DIFFRACTIVE ELEMENT FOR REDUCING FIXED PATTERN NOISE IN A VIRTUAL REALITY HEADSET

(71) Applicant: Oculus VR, LLC, Menlo Park, CA (US)

(72) Inventor: Yury Anatolievich Petrov, Coto de Caza, CA (US)

(73) Assignee: Oculus VR, LLC, Menlo Park, CA (US)

( * ) Notice: Subject to any disclaimer, the term of this patent is extended or adjusted under 35 U.S.C. 154(b) by 180 days.

This patent is subject to a terminal disclaimer.

(21) Appl. No.: 14/528,187

(22) Filed: Oct. 30, 2014

(65) Prior Publication Data
US 2016/0127717 A1 May 5, 2016

(51) Int. Cl.
*G09G 3/36* (2006.01)
*G02B 27/01* (2006.01)
*G02B 5/02* (2006.01)
*G02B 5/18* (2006.01)

(52) U.S. Cl.
CPC ........... *G09G 3/36* (2013.01); *G02B 27/0172* (2013.01); *G02B 5/02* (2013.01); *G02B 5/18* (2013.01); *G02B 2027/0147* (2013.01)

(58) Field of Classification Search
None
See application file for complete search history.

(56) References Cited

U.S. PATENT DOCUMENTS

| 5,742,262 A | * | 4/1998 | Tabata | ............... G02B 27/0081 345/8 |
| 2008/0165267 A1 | * | 7/2008 | Cok | ....................... H04N 7/144 348/333.01 |

OTHER PUBLICATIONS

Luckey, Palmer, Oculus Rift: Step Into the Game, Details on New display for Developer Kits, Dec. 2012, https://www.kickstarter.com/projects/1523379957/oculus-rift-step-into-the-game/posts/361519, pp. 1-12.*

* cited by examiner

*Primary Examiner* — Said Broome
(74) *Attorney, Agent, or Firm* — Fenwick & West LLP

(57) ABSTRACT

A virtual reality (VR) headset includes an electronic display element, a corrective element, and an optics block. The electronic display element outputs image light via a plurality of sub-pixels that are separated from each other by a dark space. The corrective element is configured to generate blur spots in the image light that mask the dark space between adjacent sub-pixels, with each blur spot corresponding to a blurred image of a sub-pixel in the image light. The optics block is configured to magnify the image light received from the corrective element and to optically correct the magnified image light. Optically corrected light is directed form the optics block to an exit pupil of the VR headset for presentation to a user.

8 Claims, 4 Drawing Sheets

DIFFRACTIVE ELEMENT FOR REDUCING FIXED PATTERN NOISE IN A VIRTUAL REALITY HEADSET

BACKGROUND

The present disclosure generally relates to reducing fixed pattern noise, and specifically relates to reducing fixed pattern noise using a diffractive element.

Electronic displays include a plurality of pixels, which may each include a plurality of sub-pixels (e.g., a red sub-pixel, a green sub-pixel, etc.). Arrangement of individual sub-pixels may affect the appearance and performance of an electronic display device. Some arrangements of sub-pixels may increase fixed pattern noise under certain conditions. For example, magnification of a pixel may result in boundaries between individual sub-pixels of the pixel becoming visible to the user, resulting in a "screen door" pattern (i.e., an increase in fixed pattern noise) in an image presented to a user.

SUMMARY

An image presented by an electronic display element within a virtual reality (VR) headset of a VR system is magnified beyond a threshold amount (e.g., magnified several-fold). As a result, an optics block included in the VR headset may cause a user viewing the image through the VR headset to see individual sub-pixels of a pixel in the image, as well as dark space between the sub-pixels (i.e., fixed pattern noise or the "screen door effect"). To reduce this screen door effect, the electronic display element of the VR headset includes a corrective element configured to blur light from the sub-pixels to mask the fixed pattern noise. For example, the corrective element is applied to the electronic display element.

The VR headset includes an electronic display including an electronic display element that outputs image light via a plurality of sub-pixels. In various embodiments, various sub-pixels have different colors. The sub-pixels separated from each other by a dark space. In some embodiments, the electronic display includes different electronic display elements for each eye of the user. Alternatively, a single electronic display element is used to display images to both eyes of the user.

In one embodiment, a corrective element configured to generate blur spots masking the dark space between adjacent sub-pixels is affixed to the electronic display. Each blur spot generated by the corrective element corresponds to a blurred image of a corresponding sub-pixel in the image light. The corrective element may be a diffraction grating or an optical diffuser. The blurred images of sub-pixels are passed to an optics block included in the VR headset. The VR headset includes an optics block for each eye of the user. An optics block is configured to magnify blurred image light output from the corrective element to produce corrected image light that is directed to an exit pupil of the VR headset for presentation to the user by an optics block.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

Figure 1:
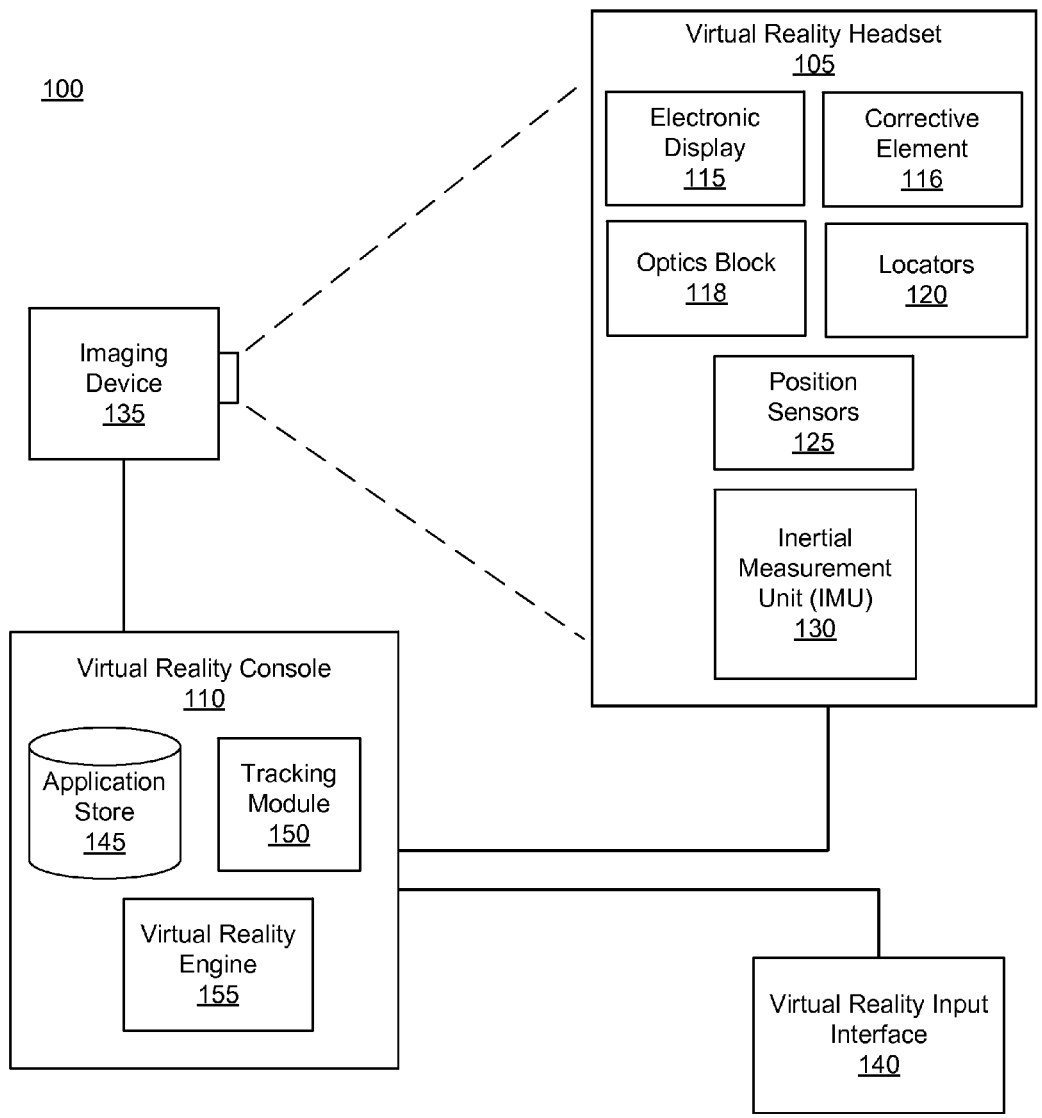
FIG. 1 is a block diagram of a system environment including a virtual reality system, in accordance with an embodiment.

FIG. 1 is a block diagram of a virtual reality (VR) system environment 100 in which a VR console 110 operates. The system environment 100 shown by FIG. 1 comprises a VR headset 105, an imaging device 135, and a VR input interface 140 that are each coupled to the VR console 110. While FIG. 1 shows an example system 100 including one VR headset 105, one imaging device 135, and one VR input interface 140, in other embodiments any number of these components may be included in the system 100. For example, there may be multiple VR headsets 105 each having an associated VR input interface 140 and being monitored by one or more imaging devices 135, with each VR headset 105, VR input interface 140, and imaging devices 135 communicating with the VR console 110. In alternative configurations, different and/or additional components may be included in the system environment 100.

The VR headset 105 is a head-mounted display that presents media to a user. Examples of media presented by the VR head set include one or more images, video, audio, or some combination thereof. In some embodiments, audio is presented via an external device (e.g., speakers and/or headphones) that receives audio information from the VR headset 105, the VR console 110, or both, and presents audio data based on the audio information. An embodiment of the VR headset 105 is further described below in conjunction with FIGS. 2A and 2B. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other.

The VR headset 105 includes an electronic display 115, a corrective element 116, an optics block 118, one or more locators 120, one or more position sensors 125, and an inertial measurement unit (IMU) 130. The electronic display 115 displays images to the user in accordance with data received from the VR console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), some other display, or some combination thereof.

The electronic display 115 includes a display area comprising a plurality of sub-pixels, where a sub-pixel is a discrete light emitting component. Different sub-pixels are separated from each other by dark space. For example, a sub-pixel emits red light, yellow light, blue light, green light, white light, or any other suitable color of light. In some embodiments, images projected by the electronic display 115 are rendered on the sub-pixel level. This is distinct from, say an RGB (red-green-blue) layout, which has discrete red, green, and blue pixels (red, green, and blue) and each pixel in the RGB layout includes a red sub-pixel, which is adjacent to a green sub-pixel that is adjacent to a blue sub-pixel; the red, green, and blue sub-pixels operate together to form different colors. In an RGB layout a sub-pixel in a pixel is restricted to working within that pixel. However, in some embodiments, sub-pixels in the electronic display operate within multiple "logical" pixels in their surrounding vicinity to form different colors. The sub-pixels are arranged on the display area of the electronic display 115 in a sub-pixel array. Examples of a sub-pixel array include PENTILE® RGBG, PENTILE® RGBW, some another suitable arrangement of sub-pixels that renders images at the sub-pixel level. In some embodiments, one or more adjacent sub-pixels are of the same color.

The corrective element 116 includes one or more corrective components that generate blur spots in the image light that mask dark space between adjacent sub-pixels. In some embodiments, the corrective element 116 is a diffraction grating, which is a type of optical component with a periodic structure that diffracts light in accordance with the wavelength of the light. For example, the diffraction grating diffracts red light more than blue light. Moreover, a diffraction grating generates multiple orders of diffracted light. Hence, in embodiments where the corrective element 116 is a diffraction grating, a blur spot for a given sub-pixel is a collection of the diffracted light associated with that sub-pixel. In alternate embodiments, a corrective element 116 is an optical diffuser, which is an element which causes light to diffuse (i.e., spread out). In embodiments where an optical diffuser is used, the blur spot is a diffused image of a sub-pixel. However, an optical diffuser may cause glare or cause excessive scattering and loss of contrast in some configurations.

In some embodiments, the corrective element 116 is affixed directly to the display area of the electronic display 115. For example, the corrective element 116 is a thin film that is attached directly to the display area of the electronic display 115. Affixing the corrective element 116 to the display area of the electronic display 115 allows the corrective element 116 to function without being carefully aligned with the sub-pixels in the electronic display 115. For example, certain elements, such as micro-lens arrays, need to be carefully aligned on a per sub-pixel basis to prevent strong moiré patterns from being visible in the resulting image. As discussed in greater detail below with regard to FIG. 3B, the amount each of the sub-pixels are blurred by the corrective element 116 is affected by various factors. Example factors include: wavelength of the light, thickness of the corrective element 116, grating pitch (distance between grooves), groove profile, material composition of the corrective element 116, diffusion parameters (e.g., haze, clarity, direct transmittance, diffuse transmittance, etc.), or some combination thereof. The corrective element 116 outputs the blurred image light to the optics block 118, allowing the blurred image light to act as a pre-distortion of the image light that, when magnified by the optics block 118, corrects for fixed pattern noise in the image presented to the user.

In various embodiments, the display area of the electronic display 115 arranges sub-pixels in a hexagonal layout, in contrast to a rectangular layout used by conventional RGB type systems. Moreover, some users are more comfortable viewing images which appear to have been generated via a rectangular layout of sub-pixels. In embodiments where the sub-pixels are arrayed hexagonally, the corrective element 116 may be configured to generate amounts of blur that causes the array of sub-pixels in the image presented to the user to appear to be arrayed in a rectangular layout.

The optics block 118 magnifies received light (e.g., the blurred image light output from the corrective element 116), corrects optical errors associated with the image light, and presents the corrected image light is presented to a user of the VR headset 105. An optical element may be an aperture, a Fresnel lens, a convex lens, a concave lens, a filter, or any other suitable optical element that affects the blurred image light. Moreover, the optics block 118 may include combinations of different optical elements. In some embodiments, one or more of the optical elements in the optics block 118 may have one or more coatings, such as anti-reflective coatings.

Magnification of the image light by the optics block 118 allows the electronic display 115 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. However, magnification of non-blurred image light may cause an increase in fixed pattern noise, also referred to as the "screen door effect," which is a visual artifact where dark space separating pixels and/or sub-pixels of a display become visible to a user in an image presented by the display. However, the optics block 118 magnifies blurred image light so the images of adjacent sub-pixels are distinguishable and blurred to cover the dark space between the adjacent sub-pixels. In some embodiments, the optics block 118 is designed so its effective focal length is larger than the spacing to the electronic display 115, which magnifies the image light projected by the electronic display 115. Additionally, in some embodiments, the amount of magnification may be adjusted by adding or removing optical elements.

The optics block 118 may be designed to correct one or more types of optical error in addition to fixed pattern noise (i.e., the screen door effect). Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error. In some embodiments, content provided to the electronic display 115 for display is pre-distorted, and the optics block 118 corrects the distortion when is receives image light from the electronic display 115 generated based on the content.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the VR headset 105, which is transparent to the wavelengths of light emitted or reflected by the locators 120 or is thin enough to not substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start or end an application or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request. In some embodiments, the VR input interface 140 may provide haptic feedback to the user in accordance with instructions received from the VR console 110. For example, haptic feedback is provided when an action request is received, or the VR console 110 communicates instructions to the VR input interface 140 causing the VR input interface 140 to generate haptic feedback when the VR console 110 performs an action.

The VR console 110 provides media to the VR headset 105 for presentation to the user in accordance with information received from one or more of: the imaging device 135, the VR headset 105, and the VR input interface 140. In the example shown in FIG. 1, the VR console 110 includes an application store 145, a tracking module 150, and a virtual reality (VR) engine 155. Some embodiments of the VR console 110 have different modules than those described in conjunction with FIG. 1. Similarly, the functions further described below may be distributed among components of the VR console 110 in a different manner than is described here.

The application store 145 stores one or more applications for execution by the VR console 110. An application is a group of instructions, that when executed by a processor, generates content for presentation to the user. Content generated by an application may be in response to inputs received from the user via movement of the HR headset 105 or the VR interface device 140. Examples of applications include: gaming applications, conferencing applications, video playback application, or other suitable applications.

The tracking module 150 calibrates the VR system 100 using one or more calibration parameters and may adjust one or more calibration parameters to reduce error in determination of the position of the VR headset 105. For example, the tracking module 150 adjusts the focus of the imaging device 135 to obtain a more accurate position for observed locators on the VR headset 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120), the tracking module 140 re-calibrates some or all of the system environment 100.

The tracking module 150 tracks movements of the VR headset 105 using slow calibration information from the imaging device 135. As further described below in conjunction with FIG. 3, the tracking module 150 determines positions of a reference point of the VR headset 105 using observed locators from the slow calibration information and a model of the VR headset 105. The tracking module 150 also determines positions of a reference point of the VR headset 105 using position information from the fast calibration information. Additionally, in some embodiments, the tracking module 150 may use portions of the fast calibration information, the slow calibration information, or some combination thereof, to predict a future location of the headset 105. The tracking module 150 provides the estimated or predicted future position of the VR headset 105 to the VR engine 155.

The VR engine 155 executes applications within the system environment 100 and receives position information, acceleration information, velocity information, predicted future positions, or some combination thereof of the VR headset 105 from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

Figure 2A:
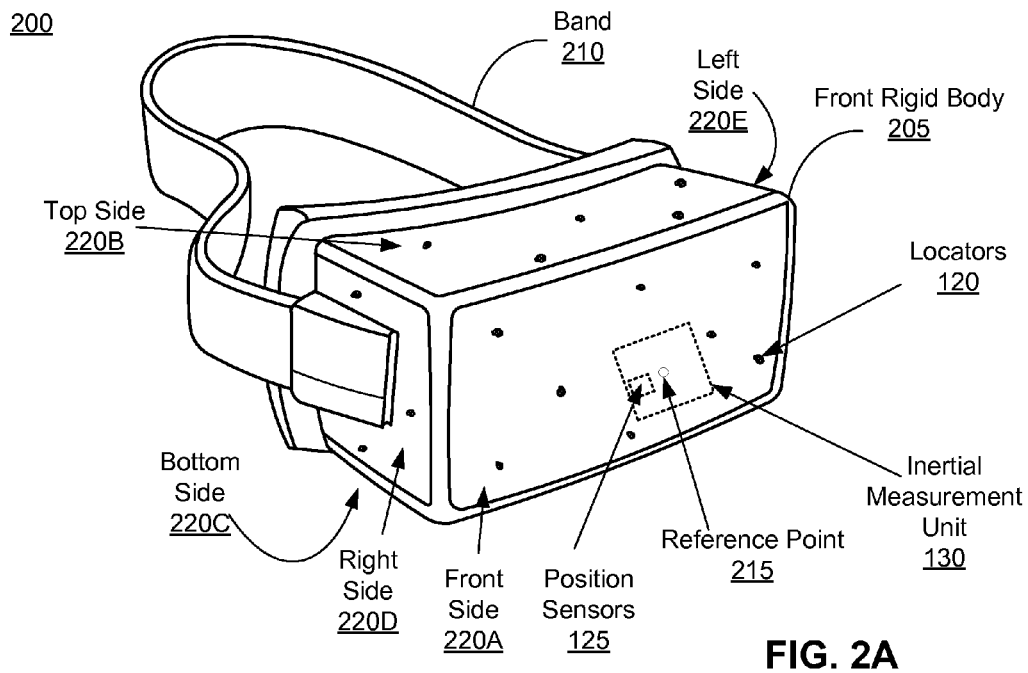
FIG. 2A is a wire diagram of a virtual reality headset, in accordance with an embodiment.

FIG. 2A is a wire diagram of a virtual reality (VR) headset, in accordance with an embodiment. The VR headset 200 is an embodiment of the VR headset 105, and includes a front rigid body 205 and a band 210. The front rigid body 205 includes one or more electronic display elements of the electronic display 115 (not shown), the IMU 130, the one or more position sensors 125, and the locators 120. In the embodiment shown by FIG. 2A, the position sensors 125 are located within the IMU 130, and neither the IMU 130 nor the position sensors 125 are visible to the user.

The locators 120 are located in fixed positions on the front rigid body 205 relative to one another and relative to a reference point 215. In the example of FIG. 2A, the reference point 215 is located at the center of the IMU 130. Each of the locators 120 emit light that is detectable by the imaging device 135. Locators 120, or portions of locators 120, are located on a front side 220A, a top side 220B, a bottom side 220C, a right side 220D, and a left side 220E of the front rigid body 205 in the example of FIG. 2A.

Figure 2B:
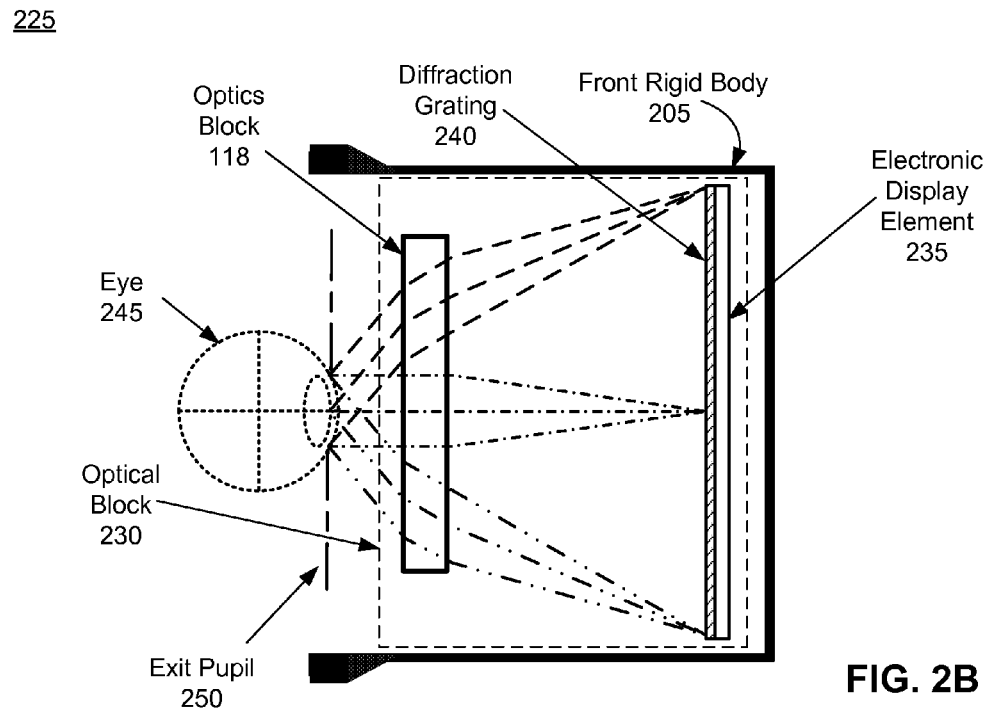
FIG. 2B is a cross section of a front rigid body of the VR headset in FIG. 2A, in accordance with an embodiment.

FIG. 2B is a cross section 225 of the front rigid body 205 of the embodiment of a VR headset 200 shown in FIG. 2A. As shown in FIG. 2B, the front rigid body 205 includes an optical block 230 that provides altered image light to an exit pupil 250. The exit pupil 250 is the location of the front rigid body 205 where a user's eye 245 is positioned. For purposes of illustration, FIG. 2B shows a cross section 225 associated with a single eye 245, but another optical block, separate from the optical block 230, provides altered image light to another eye of the user.

The optical block 230 includes an electronic display element 235 of the electronic display 115, a diffraction grating 240 of the corrective element 116, and the optics block 118. In some embodiments, the diffraction grating 240 is a thin film deposited directly on a display surface of the electronic display element 235. The electronic display element 235 emits image light, and the diffraction grating 240 blurs the image light and transmits the blurred image light toward the optics block 118. An image that is corrected for fixed pattern noise is then generated by the optics block 118 magnifying the blurred image light. In some embodiments, the optics block 118 may also correct for one or more additional optical errors (e.g., distortion, astigmatism, etc.). The optics block 118 directs the corrected image light to the exit pupil 250 for presentation to the user.

Figure 3A:
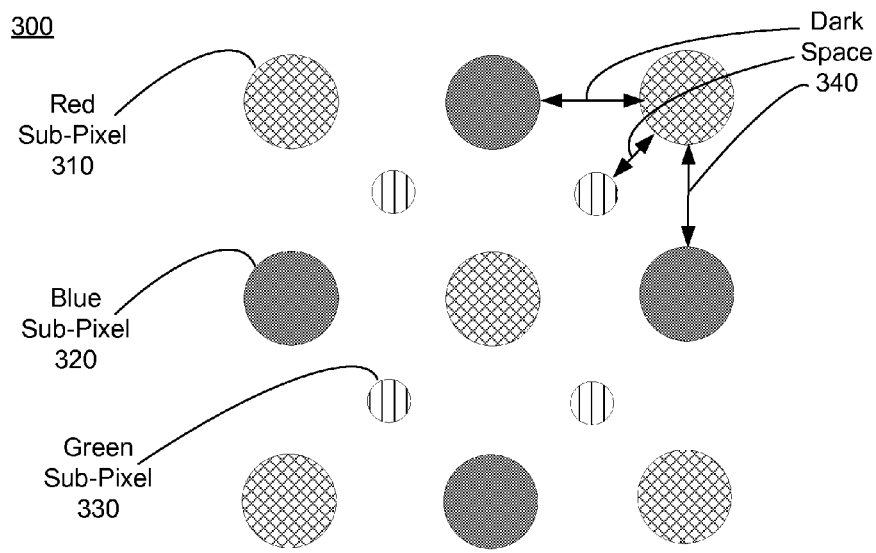
FIG. 3A is an example array of sub-pixels on an electronic display element, in accordance with an embodiment.

FIG. 3A is an example array 300 of sub-pixels on the electronic display element 235. The example array 300 shown in FIG. 3A includes red sub-pixels 310, blue sub-pixels 320, and green sub-pixels 330. For example, the array 300 is portion of a PENTILE® display. A dark space 340 separates each sub-pixel from one or more adjacent sub-pixels. The dark space 340 is a portion of the array 300 that does not emit light, and may become visible to a user under certain circumstances (e.g., magnification) causing the screen door effect that degrades image quality. As discussed above in conjunction with FIG. 2B, the optical block 230 includes one or more optical elements configured to magnify the blurred image light transmitted by the corrective element 116 to reduce fixed pattern noise so the dark space 340 between the sub-pixels is not visible to the user. The corrective element 116 is configured to blur image light generated from each sub-pixel and the optics block 118 is configured to magnify the blurred image light. The amounts of blur and magnification for image light generated from different sub pixels are determined so adjacent blur spots in the corrected image light are large enough to mask the dark space 340 between adjacent sub-pixels, while still allowing the image light from adjacent sub-pixels to be resolved by a user as image light from separate sub-pixels.

Figure 3B:
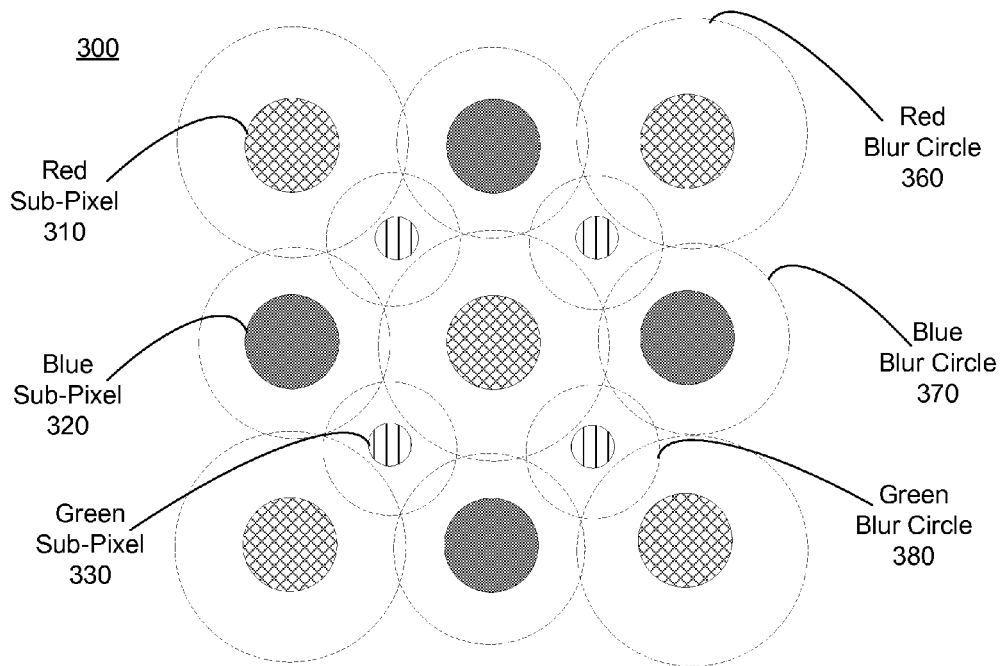
FIG. 3B is an example of image light emitted by an array of sub-pixels and adjusted by a corrective element and an optics block, in accordance with an embodiment.

FIG. 3B is an example of image light emitted by an array of sub-pixels (e.g., array 300) and adjusted by the corrective element 116 and the optics block 118. As shown in FIG. 3B, each of the sub-pixels has an associated blur spot. Specifically, the red sub-pixels 310 have a corresponding red blur spot 360, the blue sub-pixels 320 have a corresponding blue blur spot 370, and the green sub-pixels 330 have a corresponding green blur spot 380. A blur spot is an area filled with an image of a blurred sub-pixel. So long as a blur spot does not overlap with a point of maximum intensity of an adjacent blur spot, the two blur spots are resolvable as two adjacent sub-pixels. The shape of the blur spot is not necessarily a circle, but is rather an area including the blurred image of a sub-pixel. The corrective element 116 is configured to blur each sub-pixel so that after magnification by the optics block 118 the blur spots mask the dark space 340 between adjacent sub-pixels.

In embodiments where the corrective element 116 is a diffraction grating, the diffraction grating equation may be used to calculate diffraction orders for the diffraction grating. For simplicity, the diffraction grating equation for 1 dimension is:

$$n_r \sin(\alpha) - n_i \sin(\beta) = Nm\lambda \qquad (1)$$

Where N is the groove density (the pitch is 1/N), m is the order of diffraction (0, ±1, ±2, . . . ), λ is the wavelength of the light emitted from the sub-pixel, α is the angle of the light diffracted by the grating, β is the angle of the light incident on the grating, $n_r$ is the index of refraction on the medium the diffracted light is passing through, and $n_i$ is the index of refraction of the medium the light incident on the grating is passing through. As shown by equation (1), as N increases (i.e., spacing between grooves decreases) the amount of blur increases.

The amount a particular sub-pixel is blurred is based on many parameters. Example parameters include: the wavelength (λ) of the light emitted from the sub-pixel, the film thickness (h) of the diffraction grating, and the distance between grooves (also known as pitch (d)). When a diffraction grating is the corrective element 116, a blur spot is a collection of diffracted beams that are each associated with a different diffraction order. In a 2 dimensional case with a diffraction grating as the corrective element, an incident beam of light from a sub-pixel to the diffraction grating is diffracted in two dimensions by the diffraction grating into a plurality of different beams of differing diffraction orders, with the blur spot for the sub-pixel being the collection of diffracted beams. For simplicity, the distance between diffraction orders (x) of a blur spot associated with a sub-pixel may described by:

$$x = \frac{h}{\sqrt{\left(\frac{d}{\lambda}\right)^2 - 1}} \qquad (2)$$

As shown by equation (2), pitch is inversely correlated with the size of the blur spot, so the size of the blur spot decreases as the spacing between grooves increases. In contrast, the size of the blur spot and the wavelength are positively correlated, so the size of the blur spot increases as wavelength increases (e.g., from blue light to red light). Similarly, the size of the blur spot and the film thickness of the diffraction grating are positively correlated, so increasing the film thickness increases the size of the blur spot.

While equation (2) generally describes the spacing between diffraction orders of a blur spot, other parameters also affect the size of the blur spot. For example, the groove profile (i.e., the cross section of the grating) affects the number of diffracted orders that are visible. A depth of the groove profile is positively correlated with the number of diffraction beams that are visible, so a deeper groove profile allows beams of higher diffraction orders to be visible to the user. Accordingly, the size of a blur spot is dependent on both the spacing between diffraction orders (x) and the depth of the groove profile. The groove profile, film thickness, and film material are determined so the size of the blur spots of adjacent sub-pixels masks the dark space 340 between the adjacent sub-pixels but does not overlap with points of maximum intensity of adjacent blur spots after magnification by the optics block 118. Similarly, in embodiments, where the corrective element 116 is an optical diffuser, the film material, the film thickness, and the diffusion parameters are chosen so the size of the blur spot of adjacent sub-pixels are such that adjacent blur spots of adjacent sub-pixels masks the dark space 340 between the adjacent sub-pixels but does not overlap with points of maximum intensity of adjacent blur spots after magnification by the optics block 118.

It is important to avoid noise caused by diffracted orders of light overlapping more than a threshold amount with images of adjacent sub-pixels of different colors. An overlap between images of adjacent sub-pixels of different colors that exceeds the threshold amount (i.e., a blur spot does not overlap with a point of maximum intensity of an adjacent blur spot) prevents resolution of blur spots associated with adjacent sub-pixels and results in a global blurring of the image. Moreover, in embodiments where the corrective element 116 is a diffraction grating, longer wavelengths of light from a sub-pixel generally blur more than the shorter wavelengths, so the red-blur spots 360 are larger than the blue blur spots 370, for example. Accordingly, it may be advantageous to design the diffraction rating so red blur circles 360 have a particular size.

Figure 4A:
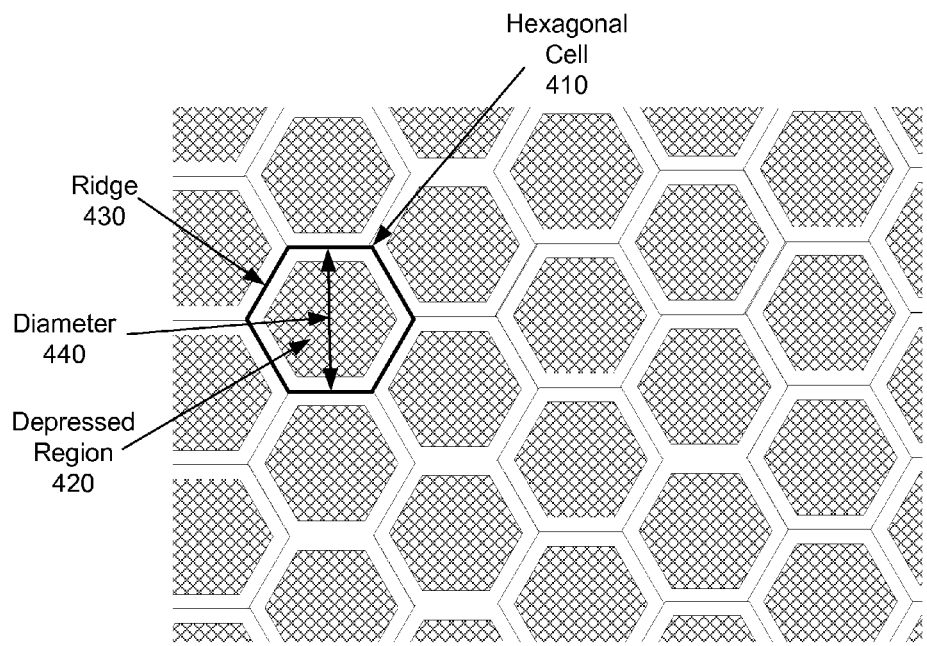
FIG. 4A is a wire diagram of an on-axis view of an example corrective element that is a diffraction grating, in accordance with an embodiment.

FIG. 4A is a wire diagram of an on-axis view of an example corrective element 116 that is a diffraction grating 400. In the example of FIG. 4A, the diffraction grating 400 comprises a plurality of hexagonal cells 410. For example, each hexagonal cell 410 has a diameter 440 of approximately 40 μm. Each hexagonal cell 410 includes a depressed region 420 that is surrounded by a ridge 430. The depressed region 420 has a maximum depth of approximately 2 μm relative to the ridge 430 in various embodiments. The diffraction grating 400 is an idealized case, and in various implementations the transition between the ridge 430 and the depressed region 420 is continuous. Moreover, profile of the ridge 420 and depressed region 420 may vary as shown in FIG. 4B.

Figure 4B:
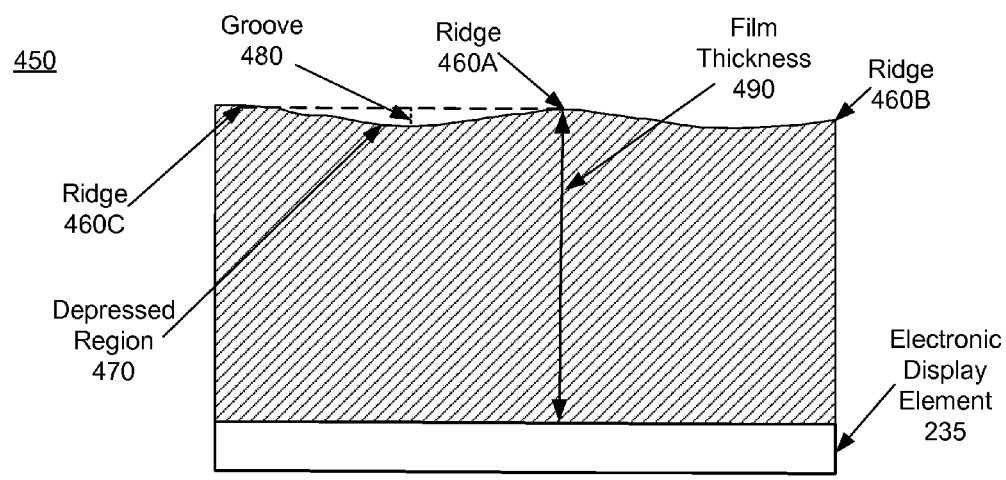
FIG. 4B is a cross section of a portion of the diffraction grating in FIG. 4A, in accordance with an embodiment.

FIG. 4B is a cross section 450 of a portion of the example diffraction grating 400 shown in FIG. 4A. The cross section 450 shown in FIG. 4B includes portions of two adjacent hexagonal cells 410, which are separated by a ridge 460A. A hexagonal cell 410 is bounded by ridge 460A and 460C, and includes a depressed region 470 that generally corresponds to the surface between the two ridges 460A and 460C. The depressed region 470 has a maximum depth 480 relative to an average height of the ridges 460A, 460C. In some embodiments, the maximum depth 480 is approximately 2 μm. Altering the size of the maximum depth 480 affects sizing of the generated blur spots. The cross section of the diffraction grating for a particular hexagonal cell 410 is the groove profile. Increasing the depth 480 of the groove profile allows visibility of light of higher orders.

In various embodiments, the portion of the diffraction grating 400 shown in FIG. 4B is affixed to the electronic display element 235. The diffraction grating 400 has a film thickness 490 corresponding to a distance between an outside surface of a film and an inside surface of the film. The outside surface is the diffraction grating 400, while the inside surface is bonded (e.g., glued) to the electronic display element 235. As discussed above, increasing the film thickness 490 of the diffraction grating 400 increases the spacing between the orders of the diffracted light. In some embodiments, the film thickness 490 is approximately 100 μm thick.

A hexagonal arrangement of the diffraction grating 400 facilitates generation of blur spots for sub-pixels having a hexagonal layout (e.g., those in FIG. 3A) that overlap to mask dark space between sub-pixels, but are still resolvable from each other. In alternative embodiments, the sub-pixels may be arranged in a different layout (e.g., rectangular), and the diffraction grating 400 may include rectangular cells instead of the hexagonal cells 410.

SUMMARY

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosed embodiments are intended to be illustrative, but not limiting, of the scope of the disclosure, which is set forth in the following claims.

What is claimed is:

1. A virtual reality (VR) headset comprising:
   an electronic display element configured to output image light via a plurality of sub-pixels, sub-pixels separated from each other by a dark space;
   a corrective element configured to generate blur spots in the image light that mask the dark space between adjacent sub-pixels, each blur spot corresponding to a blurred image of a sub-pixel in the image light;
   an optics block configured to:
     magnify the image light including the generated blur spots received from the corrective element,
     optically correct the magnified image light, and
     direct the optically corrected image light to an exit pupil of the VR headset corresponding to a location of an eye of a user of the VR headset, wherein a blur spot in the optically corrected image light does not overlap with a point of maximum intensity of an additional blur spot adjacent to the blur spot.

2. The virtual reality headset of claim 1, wherein the corrective element comprises a diffraction grating.

3. The virtual reality headset of claim 2, wherein the plurality of sub-pixels are arranged in a hexagonal layout.

4. The virtual reality headset of claim 3, wherein the diffraction grating comprises a plurality of hexagonal cells.

5. The virtual reality headset of claim 2, wherein the diffraction grating is comprises a plurality of rectangular cells.

6. The virtual reality headset of claim 1, wherein the corrective element comprises an optical diffuser.

7. The virtual reality headset of claim 1, wherein the corrective component is affixed directly to the electronic display element.

8. The virtual reality headset of claim 1, wherein the sub-pixels are arranged in a rectangular layout.

* * * * *